UNITED STATES PATENT OFFICE.

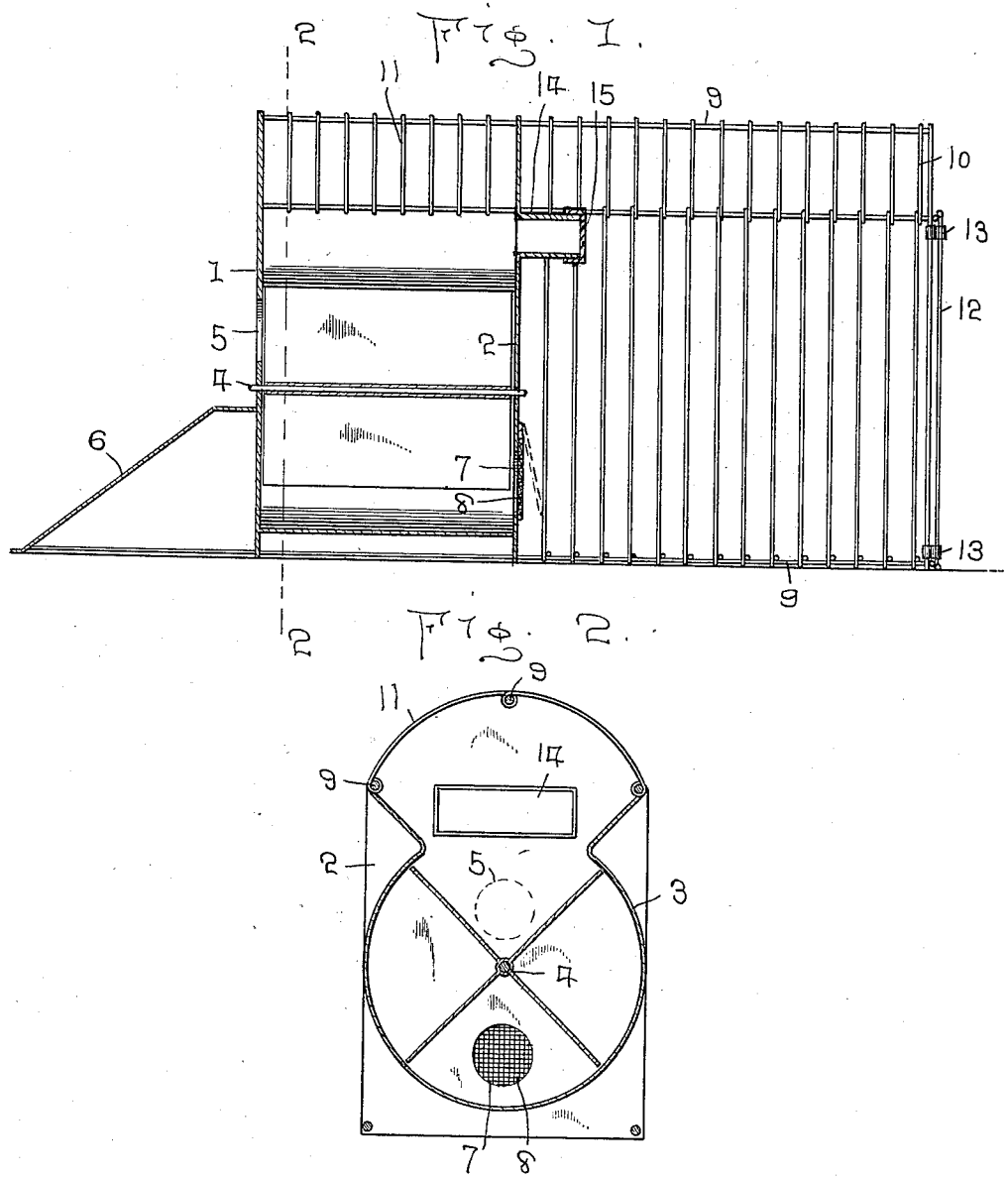

LEMUEL A. PUMPELLY, OF LOWE, KANSAS.

TRAP.

1,044,083.   Specification of Letters Patent.   Patented Nov. 12, 1912.

Application filed November 23, 1911. Serial No. 661,961.

*To all whom it may concern:*

Be it known that I, LEMUEL A. PUMPELLY, a citizen of the United States, residing at Lowe, in the county of Chautauqua and State of Kansas, have invented certain new and useful Improvements in Traps; and I do hereby declare the following to be a full, clear, and exact description of the invention, such as will enable others skilled in the art to which it appertains to make and use the same.

My invention relates to new and useful improvements in traps and more particularly to a trap adapted to be used in catching rodents or other small animals.

The object of my invention is to provide a trap having a bait receptacle therein, into which trap an animal is to be enticed and from which it will be impossible for said animal to escape.

Other objects and advantages of my invention will be hereinafter clearly set forth and pointed out in the claims.

In the accompanying drawings I have shown the preferred form which my invention may take.

In said drawings, Figure 1 is a longitudinal sectional view through the trap, and Fig. 2 is a transverse sectional view as seen on line 2—2, Fig. 1.

Referring to the drawings, in which similar reference numerals designate corresponding parts throughout the several views, 1 and 2 are the front and rear walls, respectively, of the trap portion proper of my device. Horizontally disposed between the members 1 and 2 is a semicylindrical portion 3, which is preferably formed of sheet metal, the upper portion of the material thereof being disposed outwardly, as clearly shown in Fig. 2.

A wheel 4, preferably having four blades, is horizontally mounted in the members 1 and 2, so as to be rotatable in said cylindrical portion. The wall 1 is provided with an entrance opening 5 at a point directly above the axis of the wheel 4.

In order that the animal to be caught may easily enter the entrance aperture 5, I secure to the wall 1 an upwardly inclined way 6, up which the animal may walk so that it may easily enter through the aperture. The wall 2 is provided with an exit aperture 7, said aperture being located directly below the axis of the wheel 4 and diametrically opposite the entrance aperture 5 so that when the animal is in the lower portion of the cylindrical portion it will be able to escape therefrom through said aperture.

In order that the animal may not re-enter the cylindrical portion after having once passed through the aperture 7, I provide a gate 8, which is horizontally pivoted to the rear side of the wall 2. The gate is preferably formed of screen material and is so disposed that an animal may easily push it out of the way when trying to get from the lower portion of the cylindrical portion of my trap, but will be prevented from re-entering said portion.

A cage to prevent the escape of the animal caught is formed upon the rear of the wall 2. The cage is preferably formed from wires 9 and 10. The wires 9 are horizontally disposed and secured in the walls 1 and 2 and extend rearwardly from said wall 2. The walls, top and bottom of the cage are formed by the wires 10, one end of each wire being secured to one of the wires 9 and then looped around each of the wires 9 until the first wire is again reached. The top of the trap, above the cylindrical portion 3, is formed by means of wires 11, which are looped about the horizontal wires 9, as clearly shown in Fig. 2.

In order that the animal when caught may be removed from the cage, the rear wall thereof is adapted to be closed by a gate 12, which is pivotally secured to one side of the trap, the other side of the gate being normally held closed by means of latches 13.

In order that the bait may be placed in the trap, so that rodents or other animals may be enticed therein, I provide the rear wall with a box 14, in which bait may be placed and which opens into the main portion of the trap. As clearly seen in Fig. 1, the box extends rearwardly from the wall 2 into the cage of the trap and is open at its rear end so that when it is desired to bait the trap the gate 12 may be opened and bait placed in said box. In order to prevent an animal which has been caught and is in the cage from reaching the bait, I provide a cap 15, which is adapted to be slipped over the rear end of the box to prevent the animal from gaining access thereto.

In use the trap is properly baited and placed in the desired position. An animal attracted by the bait will climb up the inclined way 6 and will see the bait through the aperture 5 and in trying to reach it will step through the aperture and upon the wheel 4. The wheel will immediately turn one-half of a revolution, due to the weight of the animal, until the animal has reached the lowest portion of the semi-cylindrical portion of the trap. It is probable that the animal will pause before forcing the gate 8 away from the exit opening 7 to enter the cage rearwardly of the rear wall 2 and before the animal leaves the semicylindrical portion of the device to enter the cage, the wheel will have assumed approximately, if not identically, the position shown in Fig. 2, owing to the fact that the animal at the bottom of the semicylindrical portion will prevent one of the blades from stopping at this point and the other in front of the entrance opening 5. It is therefore apparent that as each victim is caught and enters the cage, said victim will set the wheel 4 in the proper position for the next victim.

From the foregoing description it will be seen that when the trap is once baited a plurality of animals may be caught therein, the number being only limited by the size of the cage.

It will also be seen that the wheel 4 will be normally disposed in approximately the position shown in Fig. 2, so that the aperture 5 will always be open to allow the entrance of an animal.

What I claim as new is:

1. A trap comprising a cage and a housing secured to said cage, said housing comprising front and rear walls and a cylindrical portion connecting said walls, a wheel having a plurality of blades and rotatably mounted in said walls, one wall having an opening therein above the axis of said wheel, the other wall having an opening therein below the axis of said wheel, and diametrically opposite said first opening said second aperture communicating with said cage, a gate pivotally secured over said last mentioned opening adapted to prevent an animal from returning to said cylindrical portion, and a bait box secured to the upper end of said wall.

2. A trap comprising a cage and a housing secured to said cage, said housing comprising front and rear walls and a substantially semicylindrical portion connecting said walls, the upper horizontal edges of said semicylindrical portion being directed upwardly and outwardly, a wire covering connecting the upper horizontal edges of said semicylindrical portion, a wheel having a plurality of blades rotatably mounted in said walls, one wall having an opening therein above the axis of said wheel, and the other wall having an opening therein below the axis of said wheel and diametrically opposite said first opening, said second opening communicating with said cage.

3. A trap comprising a cage and a housing secured to said cage, said housing comprising front and rear walls and a substantially semicylindrical portion connecting said walls, the upper horizontal edges of said semicylindrical portion being directed upwardly and outwardly, a wire covering connecting the upper horizontal edges of said semicylindrical portion, a bait box formed in said rear wall and extending into said cage, a removable cover for said bait box, a wheel having a plurality of blades rotatably mounted in said walls, one wall having an opening therein above the axis of said wheel, and the other wall having an opening therein below the axis of said wheel and diametrically opposite said first opening.

In testimony whereof I have signed my name to this specification in the presence of two subscribing witnesses.

LEMUEL A. PUMPELLY.

Witnesses:
 NELLIE E. COOK,
 PERLEY F. EGGEN.

Copies of this patent may be obtained for five cents each, by addressing the "Commissioner of Patents, Washington, D. C."